US011502999B2

(12) United States Patent
Shmueli et al.

(10) Patent No.: US 11,502,999 B2
(45) Date of Patent: Nov. 15, 2022

(54) CYBER SECURITY ANONYMIZER (71) Applicant: CYLUS CYBER SECURITY LTD., Tel Aviv (IL)

(72) Inventors: Gal Shmueli, Tel Aviv (IL); Michael Shifman, Tel Aviv (IL); Amir Levintai, Tel Aviv (IL)

(73) Assignee: CYLUS CYBER SECURITY LTD., Tel Aviv (IL)

( * ) Notice: Subject to any disclaimer, the term of this patent is extended or adjusted under 35 U.S.C. 154(b) by 444 days.

(21) Appl. No.: 16/724,299

(22) Filed: Dec. 22, 2019

(65) Prior Publication Data
US 2020/0145382 A1 May 7, 2020

Related U.S. Application Data (63) Continuation of application No. PCT/IL2018/051417, filed on Dec. 31, 2018.
(Continued)

(51) Int. Cl.
*H04L 9/40* (2022.01)
*H04L 7/00* (2006.01)
(Continued)

(52) U.S. Cl.
CPC ...... *H04L 63/0421* (2013.01); *B61L 15/0027* (2013.01); *B61L 15/0072* (2013.01);
(Continued)

(58) Field of Classification Search
CPC ... H04L 63/0421; H04L 7/0008; H04L 12/42; H04L 63/1416; H04L 63/1425;
(Continued)

(56) References Cited

U.S. PATENT DOCUMENTS 9,718,487 B2 * 8/2017 Ghaly ..................... B61L 27/20
2006/0180709 A1 8/2006 Breton et al.
(Continued)

FOREIGN PATENT DOCUMENTS

DE 102010027131 1/2012
EP 2892199 7/2015
(Continued)

OTHER PUBLICATIONS

Notice of Allowance dated Jan. 26, 2022 ; pp. 1-8; for U.S. Appl. No. 17/257,329, filed Dec. 31, 2020.
(Continued)

*Primary Examiner* — Techane Gergiso
(74) *Attorney, Agent, or Firm* — A.C. Entis-IP Ltd.; Allan C. Entis (57) ABSTRACT

A cyber security system for providing security to a railway, the system comprising: a data monitoring and processing hub; a network comprising a plurality of data collection agents synchronized to a same network clock and configured to monitor railway infrastructure devices and onboard devices of rolling stock having a train communication network (TCN), and forward monitored data to the hub for processing by the hub to detect anomalies in railway operation that are indicative of a cyber-attack; at least one anonymizer configured to scrub information items from data that the hub receives from a data collection agent of the plurality of data collection agents which may be used to identify the cyber security system or the railway for which the system provides security.

20 Claims, 5 Drawing Sheets

Related U.S. Application Data (60) Provisional application No. 62/726,444, filed on Sep. 4, 2018, provisional application No. 62/671,622, filed on May 15, 2018.

(51) Int. Cl.
| | |
|---|---|
| B61L 23/04 | (2006.01) |
| B61L 27/40 | (2022.01) |
| B61L 27/53 | (2022.01) |
| B61L 27/57 | (2022.01) |
| B61L 25/02 | (2006.01) |
| H04L 12/42 | (2006.01) |
| B61L 15/00 | (2006.01) |
| G06F 1/14 | (2006.01) |
| B61L 27/70 | (2022.01) |

(52) U.S. Cl.
CPC .............. *B61L 23/04* (2013.01); *B61L 27/40* (2022.01); *B61L 27/53* (2022.01); *B61L 27/57* (2022.01); *B61L 27/70* (2022.01); *G06F 1/14* (2013.01); *H04L 7/0008* (2013.01); *H04L 12/42* (2013.01); *H04L 63/1416* (2013.01); *H04L 63/1425* (2013.01); *B61L 25/021* (2013.01); *B61L 25/025* (2013.01); *B61L 2205/00* (2013.01); *B61L 2205/04* (2013.01)

(58) Field of Classification Search
CPC .......... B61L 27/53; B61L 27/57; B61L 27/40; B61L 27/70; B61L 15/0027; B61L 15/0072; B61L 23/04; B61L 25/021; B61L 25/025; B61L 2205/00; B61L 2205/04; G06F 1/14

See application file for complete search history.

(56) References Cited

U.S. PATENT DOCUMENTS

| | | | |
|---|---|---|---|
| 2012/0198277 A1 | 8/2012 | Busser et al. | |
| 2014/0107875 A1 | 4/2014 | Beyer et al. | |
| 2014/0229040 A1* | 8/2014 | Weber ................. | G06F 11/1479 701/19 |
| 2015/0009331 A1* | 1/2015 | Venkatraman .......... | B61L 27/53 348/148 |
| 2016/0221592 A1* | 8/2016 | Puttagunta ............ | B61L 25/025 |
| 2017/0149820 A1 | 5/2017 | Ruvio et al. | |
| 2018/0191758 A1 | 7/2018 | Abbaszadeh et al. | |
| 2019/0141070 A1 | 5/2019 | Tsurumi et al. | |
| 2020/0145382 A1 | 5/2020 | Shmueli et al. | |
| 2021/0058409 A1 | 2/2021 | Shmueli et al. | |
| 2021/0392031 A1 | 12/2021 | Ali-Tolppa et al. | |

FOREIGN PATENT DOCUMENTS

| | | |
|---|---|---|
| EP | 28292202 | 7/2015 |
| EP | 3150460 | 4/2017 |
| EP | 3553682 | 10/2019 |
| EP | 3656643 | 10/2020 |
| JP | 2007243338 A | 9/2007 |
| JP | 2015030274 A | 2/2015 |
| JP | 2016502697 | 1/2016 |
| JP | 2016517597 | 6/2016 |
| JP | 2016159784 A | 9/2016 |
| WO | 2014061021 | 4/2014 |
| WO | 2014144857 | 9/2014 |
| WO | 2016148840 | 9/2016 |

OTHER PUBLICATIONS

International Search Report and Written Opinion dated Feb. 24, 2021, for Application No. PCT/IL2020/051132 Filed Oct. 30, 2020.
Wu Yongdong et al: "Vulnerabilities, Attacks, and Countermeasures in Balise-Based Train Control Systems", IEEE Transactions on Intelligent Transportation Systems, IEEE, vol. 18, No. 4, Apr. 1, 2017, pp. 814-823.
International PCT Search Report and Written Opinion dated Sep. 3, 2019 from PCT Application PCT/IL2018/051417 filed on Dec. 31, 2018.
International Search Report and Written Opinion dated Oct. 27, 2020, for Application No. PCT/IB2020/054679 Filed May 18, 2020.
CYRail Recommendations on cybersecurity of rail signalling and communication systems CYbersecurity in the RAILway sector, Sep. 1, 2018, pp. 1-72; ISBN: 978-2-7461-2747-0 Retrieved from the Internet on Sep. 29, 2020: URL:https://cyrail.eu/IMG/pdf/final_recommendations cyrail.pdf.
Office Action dated May 31, 2021 for Japanese Application No. 2020-573556 filed Nov. 13, 2020.
Japanese Office Action dated Jan. 11, 2022 for application No. 2020-573556 filed Nov. 13, 2020.
Rabatel et al., SO_MAD: SensOr Mining for Anomaly Detection in Railway Data, ICDM: Industrial Conference on Data Mining, Jul. 2009, pp. 191-205.
Zaki, "SPADE: An efficient algorithm for mining frequent sequences". Machine Learning 42(1), 2001, pp. 31-60.
Ribeiro et al.,"Sequential anomalies: a study in the Railway Industry". Machine Learning 105, 2016, pp. 127-153.
Office Action dated Feb. 16, 2021 for Australian Application No. 2020275139, filed Jan. 4, 2021.
International Search Report and Written Opinion dated Sep. 3, 2019, for Application No. PCT/IL2016/051417 filed Dec. 31, 2018.
European Extended Search Report dated Mar. 19, 2020 for Application No. 19217919.0, filed Dec. 19, 2019.
Australian Office Action dated Apr. 9, 2020 for Application No. 2019284070 filed Dec. 24, 2019.
Australian Office Action dated Apr. 9, 2020 for Application No. 2018423506 filed Dec. 24, 2019.
Stefan Axelsson Intrusion Detection Systems: A Survey and Taxonomy, Mar. 14, 2000, pp. 1-27.
Sutharshan Rajasegarar, Distributed Anomaly Detection in Wireless Sensor Networks, 2006 10th IEEE Singapore International Conference on Communication Systems, pp. 1-5.
Michael Roche, Time Synchronization in Wireless Networks, Nov. 1, 2006, pp. 1-13.
T Shimeall, Chapter 12—Recognition Strategies: Intrusion Detection and Prevention, Introduction to Information Security, Syngress, 2014, pp. 253-274.

\* cited by examiner

CYBER SECURITY ANONYMIZER

RELATED APPLICATIONS

The present application is a continuation of PCT/IL2018/051417 filed Dec. 31, 2018, which claims the benefit under 35 U.S.C. 119(e) of U.S. Provisional Application 62/671,622 filed on May 15, 2018 and U.S. Provisional Application 62/726,444 filed on Sep. 4, 2018 the disclosures of which are incorporated herein by reference.

FIELD

Embodiments of the disclosure relate to providing a system for providing cyber security to a railroad system.

BACKGROUND

Early railroad systems visually signaled train drivers and controlled trains operating on the systems using mechanical signaling and control devices to govern movement of the trains along fixed lengths of track, referred to as "blocks". Each block was the responsibility of a signalman who operated signal and control equipment to authorize and control movement of trains into and out of the signalman's block. Generally, a signalman operated from the vantage point of a second floor of a small, two story building referred to as a signal box that was high enough to offer the signalman visual surveillance of the block for which the signalman was responsible. For example, at railroad track switches at which trains are directed to proceed along different tracks, track switches and signaling equipment were manually set to required positions by signalmen operating levers or handles located in a signal box. And early automatic, track "wayside", devices were mechanical devices that operated by direct physical contact with trains. For example, train stops, which operated to automatically stop a passing train if it didn't have authority to proceed from one block to a next block, comprised an arm that engaged a valve on the passing train to trigger the train's brake system and stop the train.

However, the growth, urbanization, and globalization of the world's population generated need for and deployment of railroad systems capable of providing large transport capacities that span continents, which older conventional signaling and control technology could not support. The advent of modern digital processors, sensors, communications systems, and Global Navigation Satellite Systems (GNSSs), have made technologies available that are capable of supporting the new requirements of the railway systems. Advanced rail traffic management (ARTMN) systems based on the new technologies that are deployed and/or under development at various levels of sophistication provide real time monitoring and flexible management of train movement that adapts to operational contexts of the trains. The systems may provide such train control functionalities as Automatic Train Protection (ATP), Automatic Train Operation (ATO), and/or Automatic Train Supervision (ATS) as defined in various national and international technical standards, such as by way of example the IEEE 1474 or IEC 61375 standards. An ARTMN system may also include management and control of passenger facility infrastructures, such as train stations, fire alarm and safety systems, and passenger services such as automatic ticketing and information display systems.

The European Rail Traffic Management System (ERTMS) is an example of an ARTMN system that is a software-based railway command, signaling, and communication system, adopted by the European Union as a standard for railway control. The system comprises an ATP referred to as a European Train Control System (ETCS) that operates to provide train operation compliance with speed, safety, and inter-train spacing regulations; and a railway communications system, referred to as Global System for Mobile communications Railways (GSM-R), for voice and data services.

SUMMARY

An aspect of an embodiment of the disclosure relates to providing a cyber security system, hereinafter also referred to as "Rail-Eye", which operates to provide a railway with protection against cyber-attack. Providing protection against cyber-attack may comprise identifying an attempt to perpetrate, vulnerability to, and/or presence of a cyber-attack. Reference to a cyber-attack may refer to any one or any combination of more than one of an attempt to perpetrate, vulnerability to, and/or a cyber-attack.

In an embodiment, Rail-Eye comprises an optionally cloud based, data monitoring and processing hub, and a distributed, synchronized network of data collection agents and aggregator nodes. The data collection agents which may be referred to as "cyber-snitches", comprise infrastructure cyber-snitches and rolling stock, "onboard", cyber-snitches. Infrastructure snitches are configured to monitor communications generated by and/or operations of infrastructure equipment. Onboard snitches are configured to monitor communications generated by and/or operations of onboard equipment. An infrastructure and/or rolling stock snitch may operate and provide functions of a network tap. For convenience of presentation monitoring communications and/or operations of a piece of equipment is generically referred to as monitoring communications of the equipment. Aggregator nodes, also referred to simply as aggregators, comprise onboard aggregator nodes and infrastructure aggregator nodes. Onboard aggregators are located onboard rolling stock, and infrastructure aggregators, also referred to as RBC aggregators, are typically installed at fixed locations in railway Radio Block Centers (RBCs).

In an embodiment, the network of cyber-snitches, aggregators, and Rail-Eye hub are configured in a hierarchical logical topology. Onboard cyber-snitches transmit data they acquire from communications that they monitor to onboard aggregator nodes in data messages. Onboard aggregator nodes may forward data as received, and/or as processed, optionally to identify presence of a cyber-attack, to RBC aggregators. Infrastructure cyber-snitches also transmit data they acquire from communications that they monitor to RBC aggregators in data messages. RBC aggregators in turn may forward data as received, and/or as processed by the RBC aggregators, optionally to determine presence of a cyber-attack to the Rail-Eye hub for storage and/or for processing, optionally to determine presence of a cyber-attack. In an embodiment, the hub and/or an aggregator determining that a cyber-attack is indicated may be configured to undertake a response to the indicated cyber-attack.

In an embodiment, the Rail-Eye system is synchronized to a common, network clock time, optionally based on a reference frequency and time of day (TOD) timing information provided by transmissions from a GNSS. Data that an onboard and/or infrastructure cyber-snitch transmits in a data message to an aggregator may be time stamped with a time based on the network clock time at which the monitored communication comprising the data is received by the cyber-snitch. The time stamp associated with data that an onboard cyber-snitch transmits in a data message may comprise a time lapse between a beginning of a turn of a multifunctional vehicle bus (MVB) comprised in a train communication network (TCN) of the train in which the onboard cyber-snitch is located.

To facilitate processing monitored data, in accordance with an embodiment of the disclosure, cyber-snitches and/or aggregator nodes in the Rail-Eye system may be provisioned with algorithms configured to generate data messages responsive to the different types of communications that they may monitor in accordance with a common Rail-Eye rapporteur protocol.

In an embodiment, to minimize interference that a cyber-snitch or aggregator may have on operation of onboard and/or infrastructure equipment, the cyber-snitch and/or aggregator may operate in a stealth mode in which the cyber-snitch and/or aggregator are in compliance with standards that govern interference with operation of railway equipment. By way of example a cyber-snitch monitoring an onboard or infrastructure device may be configured to acquire data from the device during idle periods of the device. To augment stealth operation and reduce bandwidth that activity of cyber-snitches and aggregators require for transmission of data, a rapporteur protocol in accordance with an embodiment may compress data that it configures for transmission in data messages.

In an embodiment Rail-Eye maintains a reference database, hereinafter also referred to as an "anonymized database" (ANDAT), of records of anomalous events that are associated with, or had been under suspicion of being associated with, a cyber-attack and have been processed to remove or conceal information elements that might enable identification of a target of the cyber-attack. Records of events stored in the anonymized database that have been processed to remove or conceal target ID information may be referred to as anonymized event records and an event for which an anonymized event record was generated may be referred to as an anonymized event. In an embodiment, the anonymized database is configured to enable entities other than a given entity that was the target of a cyber-attack associated with an anonymized event record to access the anonymized event record, for example for purpose of analysis, without being able to identify the given target entity from data in the database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

In the following detailed description, components of a Rail-Eye system operating to provide cyber security to a railway system in a train operations area are discussed with reference to FIGS. 1A and 1B. FIGS. 2A-2C schematically show details of a train communication network (TCN) optionally comprising a "train-wide", wire train bus (WTB) that spans the length of a train and is coupled to multifunctional vehicle buses (MVB), each of which supports communications for onboard devices in a single car of the train. Placement and operation of onboard cyber-snitches and onboard aggregators located in the train in accordance with an embodiment of the disclosure are discussed with reference to the figures.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Unless otherwise indicated, the word "or" in the description and claims is considered to be the inclusive "or" rather than the exclusive or, and indicates at least one of, or any combination of items it conjoins.

Figure 1A:
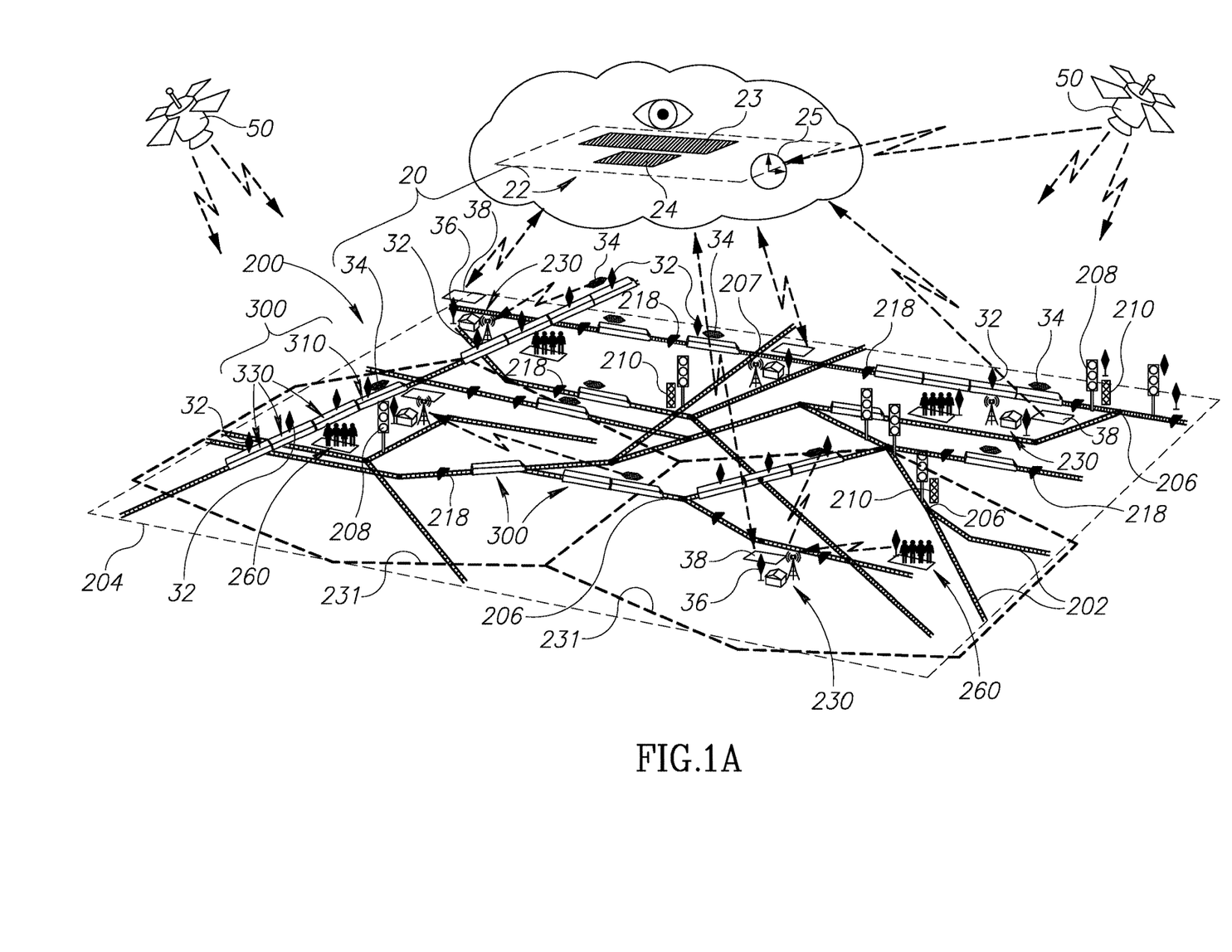
FIG. 1A schematically shows a Rail-Eye system comprising a cloud-based data monitoring and processing hub and a distribution of cyber-snitches operating to protect a railway system from cyber incursion, in accordance with an embodiment of the disclosure.

FIG. 1A schematically shows a perspective view of Rail-Eye system 20, operating to provide cyber-protection to a railway system 200, in accordance with an embodiment of the disclosure. FIG. 1B schematically shows an enlarged portion of railway system 200 and Rail-Eye 20, in accordance with an embodiment of the disclosure.

Railway system 200 comprises an infrastructure of tracks 202 along which trains 300 move to transport passengers and goods, and infrastructure equipment that cooperate to control movement of the trains in an operations area schematically represented by a dashed rectangle 204. The infrastructure equipment comprises switches (not shown) at track junctions 206, signaling apparatuses represented by color light signal equipment 208 along the tracks and at track junctions 206 and crossovers 207, interlocking systems 210 at the track junctions, trackside balises 218, RBCs 230, each represented by a house and radio antenna tower, and train stations represented by clusters of human icons 260.

A signaling apparatus 208 conventionally referred to as a "signal" is a trackside device, typically a color light device as schematically shown in FIG. 1A, operable to visually transmit to a train driver by color of lights that the signal displays, information relating to the state of track ahead of a train which the train driver is driving. For example, a signal 208 might inform the train driver of a speed at which the train may safely proceed, or, if the track ahead of the train is occupied by another train, instruct the train driver to stop the train. An interlocking system 210, conventionally referred to as an "interlocking", controls signaling and switches at a track junction 206 to prevent conflicting movement and provide for safe passage of trains through the junction. A balise 218, such as a Euro-balise used by the ERTMS, is a passive electronic beacon mounted to a track sleeper between the rails of a track. The balise receives energy from a train passing over the balise and uses the energy to transmit information to the train via a signal referred to as a telegram. The telegram typically comprises a unique identification of the balise and thereby location of the train as it passes over the balise, speed limits, gradients, and if the balise is a balise referred to as a transparent balise, it may be operated to provide movement authority.

A radio block center, RBC 230, is a radio control center that communicates with trains 300, and infrastructure equipment over a railway communications system, such as GSM-R, in an area referred to as an RBC control area for which the RBC has radio coverage and is responsible for safe operations of the trains. By way of example, control areas for two adjacent RBCs 230 are schematically indicated by dashed hexagonal boundaries 231. An RBC 230 receives data relevant to the status and locations of trains 300 in control area 231 of the RBC via GSM-R radio transmissions from the trains and data relevant to status of infrastructure equipment such as interlockings 210 in the RBC control area 231 via wire and/or radio communication. The RBC processes the received data and information to formulate and transmit movement authorities to trains 300 and data to interlockings 210 for use by the interlockings to control signaling and switching at track junctions 206 at which the interlockings are respectively located. The movement authorities that an RBC generates and transmits to the trains are determined to provide distances between trains that maintain safe headways (distances between trains and next trains) and generally also advantageous transport capacity.

Trains 300 comprise a locomotive 310 and optionally one or more train vehicles 330, also referred to as cars 330. Enlarged images and details of a train 300, locomotive 310, and car 330 are schematically shown in FIGS. 2A, 2B and 2C respectively. Generally, a train 300 has a train communications network, TCN 331 (FIGS. 1B, 2A-2C), comprising a train-wide bus, WTB 336, running the length of the train, and for each car 330 and locomotive 310, an MVB bus 332 connected to the WTB by a train vehicle gateway 334. MVB 332 in a given car 330 or locomotive 310 supports communications between and with onboard devices, generically referenced in FIGS. 2A-2C by the label 360 (FIGS. 2A-2C), in the car or locomotive. For example, in a train car 330 door control actuators, air-conditioning, lighting, and passenger information devices are connected to MVB 332. Transmissions over MVB 332 by devices 360 attached to MVB 332 are controlled by at least one bus master 335 which controls access to MVB 332 during sequential time periods referred to as turns. WTB 336 supports communications between cars 330 and between cars 330 and locomotive 310. Brake control apparatus 362 (FIG. 2C) in each car 330 and locomotive 310 is typically directly connected to WTB so that application and release of brakes in train 300 may be properly synchronized. Locomotive 310 typically comprises a communication module 312 (FIG. 1B) having a suitable front end and antenna that supports GSM-R communications with RBCs 230 (FIGS. 1A and 1B) and trackside equipment, a GSNS (Global Satellite Navigation System) receiver 313, and a balise reader 314 (FIGS. 2A, 2B) configured to interface with balises 218 (FIGS. 1A, 1B).

The locomotive is mandated to comprise an event recorder, which in European Train Control Systems, ETCS, is a Juridical Recording Unit (JRU). The event recorder or JRU, hereinafter generically referred to as a JRU, is a rolling stock "black box" recorder, which receives and stores data relevant to events of specific interest that may occur during operation of train 300 to facilitate analysis of train behavior and accidents in which the train may be involved. The ERTMS has defined a set of specific events, hereinafter also referred to as JRU events, which trigger transmission to the JRU of data relevant to the events in formatted message packets, referred to as JRU data messages that identify the events. A JRU data message associated with a given JRU event includes the date and time of occurrence in UTC of the event and other information items that identify the JRU event. A list of JRU events is provided in an ERTMS/ETCS functional interface specification (FIS) entitled FIS Juridical Recording.

Figure 1B:
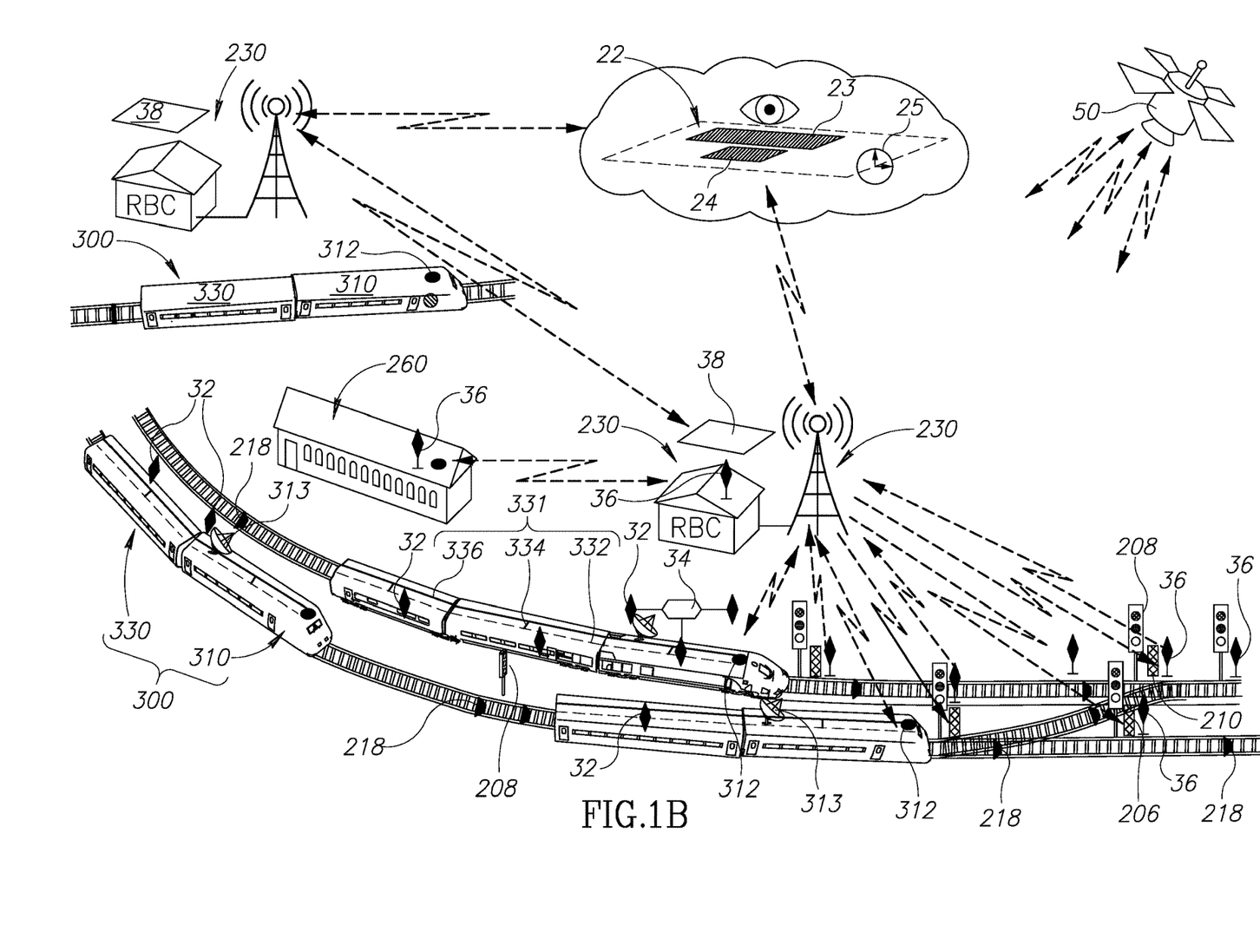
FIG. 1B schematically shows an enlarged image of a portion of the railway system shown in FIG. 1A, in accordance with an embodiment of the disclosure.
Figure 2A:
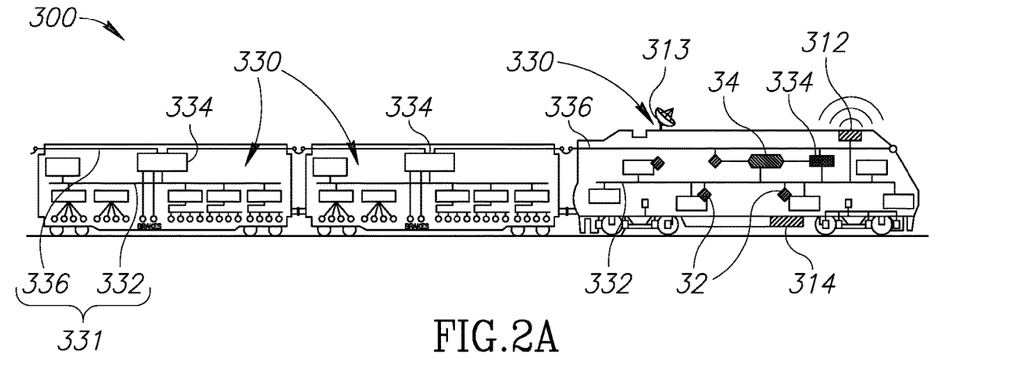
FIG. 2A schematically show a train, components of the train TCN, and cyber-snitches and aggregators connected to the TCN, in accordance with an embodiment of the disclosure.
Figure 2B:
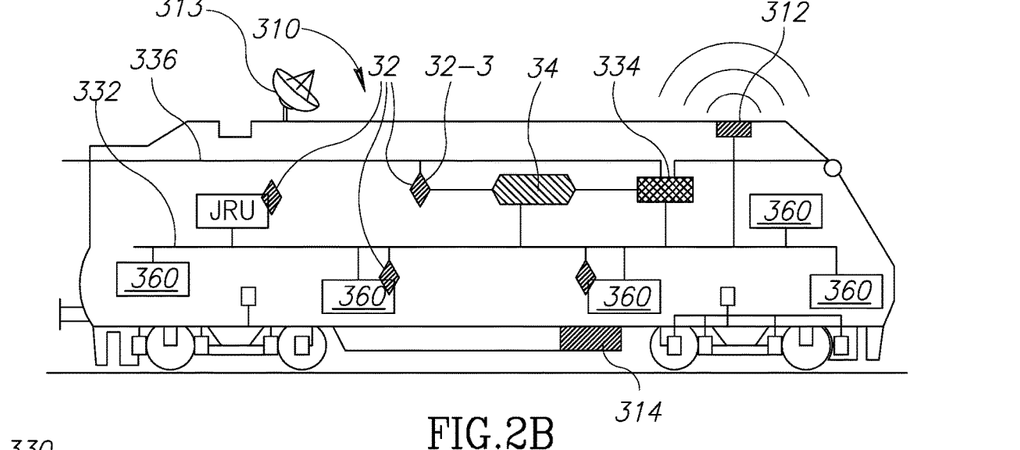
FIG. 2B schematically shows a locomotive of the train shown in FIG. 2A and cyber-snitches and aggregators connected to devices in the locomotive, in accordance with an embodiment of the disclosure.
Figure 2C:
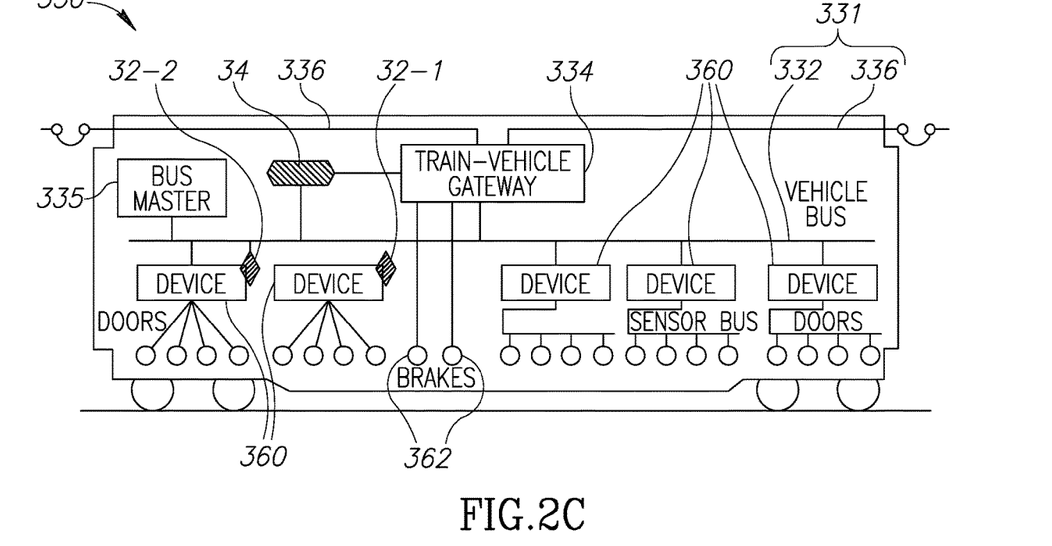
FIG. 2C schematically shows a car of the train shown in FIG. 2A and cyber-snitches and aggregators connected to devices in the car, in accordance with an embodiment of the disclosure.

Rail-Eye system 20 optionally comprises a data monitoring and processing hub 22 (FIGS. 1A and 1B), which may, as shown in FIGS. 1A and 1B, be cloud based, and a network of onboard cyber-snitches schematically represented by diamond shape icons 32, and onboard aggregator nodes 34 schematically represented by hexagonal shape icons, located on trains 300. For convenience of presentation, in FIGS. 1A and 1B, to accommodate constraints on sizes of images shown in the figures, onboard cyber-snitches 32 and aggregators 34 are shown over or on images of trains 300, and a single onboard cyber-snitch 32 and/or onboard aggregator 34 associated with a train 300 or portion of a train 300 in FIGS. 1A and 1B represents one or more cyber-snitches and/or one or more onboard aggregators respectively. FIGS. 2A-2C schematically show details discussed below of possible placements of onboard cyber-snitches 32 and onboard aggregators 34 in a train 300 and how they may be connected to the train's TCN 331 (FIG. 1B, 2A-2C). Rail-Eye 20 also comprises stationary, infrastructure cyber-snitches, schematically represented by icons 36, and RBC aggregators 38 (FIGS. 1A-2C) that communicate with the infrastructure cyber-snitches. A single infrastructure cyber-snitch 36 and/or a single RBC aggregator 34 shown in FIGS. 1A and 1B represents one or more of an infrastructure cyber-snitch and aggregator respectively.

Onboard and infrastructure cyber-snitches 32 and 36, and aggregators 34 and 38 may be configured as separate bare metal components, as might be inferred from FIGS. 1A-2C. However, cyber-snitches and aggregators in accordance with an embodiment of the disclosure may be defined by software and hardware components, or only by software components and may quite generally comprise any combination of software and/or hardware components that support functionalities of the cyber-snitches and aggregators.

For example, a cyber-snitch or aggregator may be a bare metal, hardware module comprising any electronic and/or optical processing and/or control circuitry, to provide and enable functionalities that the cyber-snitch or aggregator may require to support monitoring or processing functionalities of the cyber-snitch or aggregator. The cyber-snitch or aggregator may comprise any one, or any combination of more than one of, a microprocessor, an application specific circuit (ASIC), field programmable array (FPGA) and/or system on a chip (SOC). The cyber-snitch or aggregator may comprise a memory having any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM). A cyber-snitch or aggregator may be a software module comprised in any of various onboard and/or infrastructure equipment of a railway system and may cooperate with hardware and/or software in railway system equipment to perform functionalities of the cyber-snitch and/or aggregator. A cyber-snitch or aggregator may be a virtual entity. Similarly, hub 22 optionally has a memory 23 and a processor 24 configured to support functionalities of the hub, may comprise any combination of hardware and software components, and may comprise or be a virtual entity.

As schematically shown in FIGS. 2A-2C onboard cyber-snitches 32 and onboard aggregators 34 may be coupled to different onboard equipment in a train 300 to monitor communications generated by devices in the train and transmit data from the monitored communications to onboard aggregator 34 of the train for forwarding to an RBC 230 and/or hub 22 for processing and optionally storage. And a cyber-snitch 32 may be coupled in different ways to a device 360 in train 300 and to TCN 331 of the train to acquire and forward the data.

For example, an onboard cyber-snitch 32 distinguished by a label 32-1 located in a car 330 (FIG. 2C) may be coupled directly to a device 360 in the car to monitor communications generated by the device. Cyber-snitch 32-1 may be coupled to a port (not shown) of device 360 to monitor communications propagated through the port or to a processor (not shown) comprised in the device to monitor activity of the processor. Cyber-snitch 32-1 is optionally not directly connected to TCN 331 by a connection to MVB 332 and may be configured to use a connection that device 360 has to MVB 332 to transmit data acquired from the monitored communications or activity to the MVB and therefrom to aggregator 34 in car 330. Alternatively or additionally, a cyber-snitch 32, such as the cyber-snitch distinguished by a label 32-2 in FIG. 2C, monitoring a device 360 in car 330 may itself be directly coupled to MVB 332 to transmit data to TCN 331 that cyber-switch 32-2 acquires from monitored communications. An onboard aggregator 34 in car 330 may be connected to MVB 332 to receive and aggregate data comprised in data messages transmitted by cyber-snitches 32-1 and 32-2 for forwarding and processing. Onboard aggregator 34 may process the aggregated data to determine possible presence of a cyber-attack and forward aggregated data and/or aggregated data as processed to train vehicle gateway 334 for transmission via WTB 336 to locomotive 310 and forwarding by GSM-R communication to an RBC 230. An onboard aggregator, such as aggregator 34 comprised in locomotive 310 schematically shown in FIG. 2B may receive data messages generated by a cyber-snitch distinguished by a label 32-3 monitoring WTB 336.

In an embodiment, to reduce bandwidth use and possible interference that activity of cyber-snitches 32 and 36 and aggregators 34 and 38 may have on operations of onboard and/or infrastructure equipment of railway system 200, a cyber-snitch and/or aggregator may compress data it receives for transmission in a data message and/or processing. Optionally, to facilitate processing data comprised in data messages that cyber-snitches and aggregators comprised in Rail-Eye 20 generate and transmit, the data messages may be configured in accordance with a common Rail-Eye rapporteur protocol. In an embodiment a data message configured in accordance with the Rail-Eye rapporteur protocol may comprise a message field encoding a weighting vector having components that indicate degree of relevance of the data for different operational aspects of the railway system. The weighting vector for a data message generated by a cyber-snitch aggregator may for example indicate how relevant the data may be for safety of operation of rolling stock and/or infrastructure equipment, provide a desired time frame and/or priority for processing the data, and/or that an alarm should be raised to indicate that human intervention is advised. Weighting may be context dependent.

Rail-Eye 20 components are optionally synchronized to a same network clock schematically represented by a clock 25 that generates a reference frequency and TOD based on timing information and TOD signals received from a GNSS system schematically represented by satellites 50. Cyber-snitches and aggregators may time stamp data that they acquire with network clock times at which they acquire the data. In an embodiment, the Rail-Eye system is synchronized to a common, network clock time, optionally based on a reference frequency and time of day (TOD) timing information provided by transmissions from a GNSS. As noted above, transmissions over MVB 332 by devices attached to the MVB are controlled by at least one bus master 335 which controls access to MVB 332 during sequential time periods turns. In an embodiment, an onboard snitch 32 may time stamp data that it acquires from an onboard device 360 with a time lapse, also referred to as a "turn time" lapse, between a time at which the cyber-snitch acquired the data and a beginning of a turn during which the data was acquired. An onboard and/or RBC aggregator, a train vehicle gateway, and/or hub 22 that receives the data may determine when the data was acquired relative to network time using the turn time lapse.

In an embodiment, as indicated in FIGS. 1A and 1B, the network of cyber-snitches 32 and 34, aggregators 36 and 38, and Rail-Eye hub 20 are configured in a hierarchical logical topology. Onboard snitches 32 transmit data messages to onboard aggregators 34 for processing and/or forwarding to RBC aggregators 38. Onboard aggregators 34, infrastructure snitches 34, and optionally onboard snitches 32, transmit data to RBC aggregators 38 for processing. RBC aggregators 38 in turn transmit data they receive and/or have processed to Rail-Eye hub 22 for processing.

Optionally, Rail-Eye 20 is configured to process data acquired by onboard and infrastructure cyber-snitches 32 and 34 in "layers" homomorphic to the hierarchical network topology to determine presence of a possible cyber-attack.

Onboard aggregators 34 may be configured to identify anomalous events responsive to data they receive and aggregate from onboard snitches 32 on respective trains 300 in which the onboard aggregators are located. In an embodiment, an onboard aggregator 34 may determine an operational train context for the train in which the onboard aggregator is located, and identify anomalous events based on the train context. A train context may comprise by way of example, at least one or any combination of more than one of train speed, track conditions, traffic congestion, ambient weather conditions, passenger or freight loading, number of cars in the train, number of locomotives in the train and specifications of locomotives and cars. Optionally, upon identifying an indication of a cyber-attack, onboard aggregator 34 may operate to undertake a response to the attack.

For example, in an embodiment, onboard cyber-snitches 32 in a car 330 of a train 300 may monitor devices 360 controlling doors in the car and generate and transmit to an onboard aggregator 34 in the car data messages comprising data indicating status of the doors. The onboard aggregator 34 in the car that receives the data messages may determine an operational context for the train comprising values based on speed and location of the train for times at which time stamps in the data messages indicate the status data was acquired by the cyber-snitches. For a situation in which the data messages from cyber-snitches 32 indicate that doors of car 330 are open, aggregator 34 may generate and transmit to an RBC aggregator 38 (FIG. 1B) a data message for which a weighting vector has a very large weight for each of both operational safety and anomalousness indicative of possible cyber-attack if train 300 is carrying passengers between railway stations. The magnitudes of the large weights may be dependent on speed and/or location of the train indicated by the operational train context. Optionally, onboard aggregator 34 may be configured to respond to the situation as a function of magnitudes of the safety and anomalousness weights. For instance, if the weighting vector weight for either operational safety or anomalousness exceeds a predetermined threshold, aggregator 34 may generate an alarm notice to a driver of the train and/or the RBC aggregator 38. On the other hand, the weights for operational safety and anomalousness may be relatively low if the train context determined by aggregator 34 indicates that car 330 is empty of passengers or the train is in a train yard.

By way of another example, an onboard cyber-snitch 32 may be coupled to WTB 336 and an output of train vehicle gateway 334. The cyber-snitch may generate and transmit data messages to an onboard aggregator 34 responsive to time delays between the gateway receiving a communication via WTB 336 to activate or release brakes in the car and a time at which the gateway transmits a corresponding activation signal to the brakes. If the time delay exceeds a predetermined maximum could be the cyber-snitch may determine presence of an anomaly indicating a possible cyber-attack.

RBC aggregators 38 may be configured to identify anomalous events indicating a possible cyber-attack responsive to data the RBC aggregators 38 receive from infrastructure snitches 34, and onboard snitches 32 and/or onboard aggregators 34 located in respective control areas 231 (FIG. 1) of the RBCs 230 in which the RBC aggregators are located. An RBC aggregator 38 may be configured to determine an RBC control area context for rolling stock and/or infrastructure equipment in its control area 231 and identify anomalous events, optionally based on the RBC context. An RBC control area context may comprise at least one of or any combination of more than one of measures related to track conditions, such as state of rail repair and railhead adhesion, weather conditions, such as visibility and precipitation, and rolling stock status, such as congestion and types of rolling stock moving in a control area 231 of an RBC 230. A control area context may also comprise customer demand for rail transportation as evidenced by numbers of people physically present at railroad stations and/or ticket purchases for train travel in the RBC control area. Optionally, an RBC aggregator 38 may be configured to undertake a response to an identified possible cyber-attack.

For example, anomalous situations on a single train 300, such as anomalous door statuses or time delays discussed above with respect to a train 300 may be due to device malfunction on the train rather than a cyber-attack. However, in an embodiment, an RBC aggregator 38 is configured to correlate data messages from different onboard and infrastructure cyber-snitches in a control area 231 of RBC 230 with which RBC aggregator 38 is associated. If the RBC aggregator receives data from onboard aggregators 34 reporting similar anomalies in door status or time delays for a plurality of different trains 300 in control area 231 of RBC 230, the RBC aggregator may correlate the data to determine with greater reliability that the data is indicative of a cyber-attack.

By way of another example, in an embodiment an RBC aggregator 38 may determine that a cyber-attack is possibly present responsive to data messages received from infrastructure cyber-snitches 36 monitoring signal lights 208, balises 218, and interlockings 210 at a track intersection 206 (FIG. 1B). For example, control of switches and signals 208 at a track intersection 206 in a control area 231 (FIG. 1B) of an RBC 230 to enable trains to move through the intersection safely generally involves a carefully timed choreography of signals and events orchestrated by the RBC in cooperation with an interlocking 210 located at the intersection. Trains 300 approaching and leaving a neighborhood of the intersection report their locations based on balise telegrams and/or GNNS locations via GSM-R to RBC 230. Based on the location information and an RBC control area context parameter such as train congestion, the RBC determines movement authorizations for the trains and corresponding control sequences for the switch and signal 208 to be mediated by interlocking 210 to enable safe passage of a train through the intersection. For passage of a given train 300 through the intersection, RBC aggregator 38 may process data messages received from onboard cyber-snitches 32 via an onboard aggregator 34 on the train and infrastructure cyber-snitches 36 monitoring equipment at the intersection, to determine whether passage of the train comports with a normative scenario of signaling and movement of a train through the intersection. If events associated with passage of the train do not comport with a normative scenario, RBC aggregator 38 may determine that presence of a possible cyber-attack is indicated. Normative scenarios for use by the RBC aggregator may be stored in a database (not shown) comprised in the RBC aggregator or in a database, for example database 23 comprised in hub 22, to which the RBC aggregator has access.

Rail-Eye hub 22 may operate to identify anomalous events indicating a possible cyber-attack responsive to data the hub receives from cyber-snitches 32 and 34 and aggregators 36 and 38 in geographical railway operations area 204 in which railway system 200 for which Rail-Eye 20 is responsible operates. Optionally, hub 22 is configured to generate a system context for operations of the railway system in railway operations area 204 and identify anomalous events indicating a possible a cyber-attack based on the system context. A system context may comprise at least one of or any combination of more than one of time of day, season, holiday, special events in the operations area, weather, and/or status of a power grid supplying power to railway system 200. In an embodiment, hub 22 may be configured to identify, based on data that the hub receives, anomalous events indicative of a possible cyber-attack on a given train 300, in a given RBC control area 231, as well as a possible system-wide cyber-attack in railway operations area 204 of railway system 200. Hub 22 may be configured to undertake a response to an identified possible cyber-attack.

As in the case of an RBC aggregator 38 which may correlate data received from a plurality of trains in a control area of the aggregator's RBC 230 to improve reliability of identification of a possible cyber-attack, hub 22 may operate to correlate data received from a plurality of RBC aggregators 38 to improve reliability of an identification of a cyber-attack. For example, as in the case of a malfunction of onboard equipment in a train giving rise to a suspicion of a cyber-attack, malfunction and/or weather conditions may affect operation of wayside equipment and/or an RBC 230 and give rise to an RBC aggregator 38 determining that there is a suspicion of a cyber-attack. By correlating data received from a plurality of RBC aggregators 38 hub 22 may improve reliability of a determination that the suspicion is due to an actual cyber-attack.

By way of another example, in an embodiment of the disclosure hub 22 may be configured to determine normative geographic and/or temporal patterns for activity of railway system 200 in railway operations area 204 and store the normative patterns in memory 23 of the hub. The hub may compare real time patterns of activity of the railway system based on data that the hub receives in data messages from cyber-snitches and aggregators to normative patterns to determine if a cyber-attack is present. For example, activity of railway system 200 may exhibit normative diurnal, monthly, and/or seasonal patterns of activity and if a real time pattern of activity differs from a normative pattern, hub 22 may determine that the difference indicates presence of a cyber-attack.

By way of a specific example, normative passenger rail traffic in a given suburban region of a particular RBC control area 231 may be high in the morning as people from the suburban region travel to work in a metropolis in another RBC control area, taper off during late morning and early afternoon and increase again towards evening as people return from work. Normative train speeds and headways in the given suburban region are expected to correlate with the traffic. Train speeds may be expected to be high and headways relatively short during the morning and late afternoon hours to provide capacity advantageous for servicing the heavy passenger traffic. Train speeds are expected to be respectively relatively low and headways long during the late morning and early afternoon hours when traffic is relatively light. If data processed by hub 22 indicates that magnitudes of real time train speeds and/or headways vary from magnitudes of the normative train speeds and headways respectively or are out of phase with passenger traffic load hub 22 may determine that a cyber-attack is present.

A Rail-Eye system in accordance with an embodiment of the disclosure may comprise and/or have access to an anonymized database (ANDAT), in which data relevant to a cyber-attack that a given railway has encountered may be stored, so that the data may be accessible to other railways but not readily associated with the given railway. Cyber-attack data that is not readily associated with a given railway may be referred to as anonymized data. Anonymized data may be uploaded to ANDAT after the data has been processed to anonymize the data or uploaded to and stored in ANDAT prior to anonymization and processed to be anonymized before being downloaded by an entity authorized to access data in ANDAT. By enabling sharing of cyberattack data between cooperating railways having access to ANDAT, ANDAT provides railways using the database access to a greater amount of cyber-attack data than would normally be available to a single railway. As a result, a railway, using the ANDAT database may be able to generate improved analysis of cyber-attacks for its own use in buttressing its ability to detect and counter cyber-attacks. Anonymizing cyber-attack data operates to make it more difficult for a cyber criminal to analyze the data to identify and exploit cyber vulnerabilities of particular railways that use ANDAT.

Figure 3:
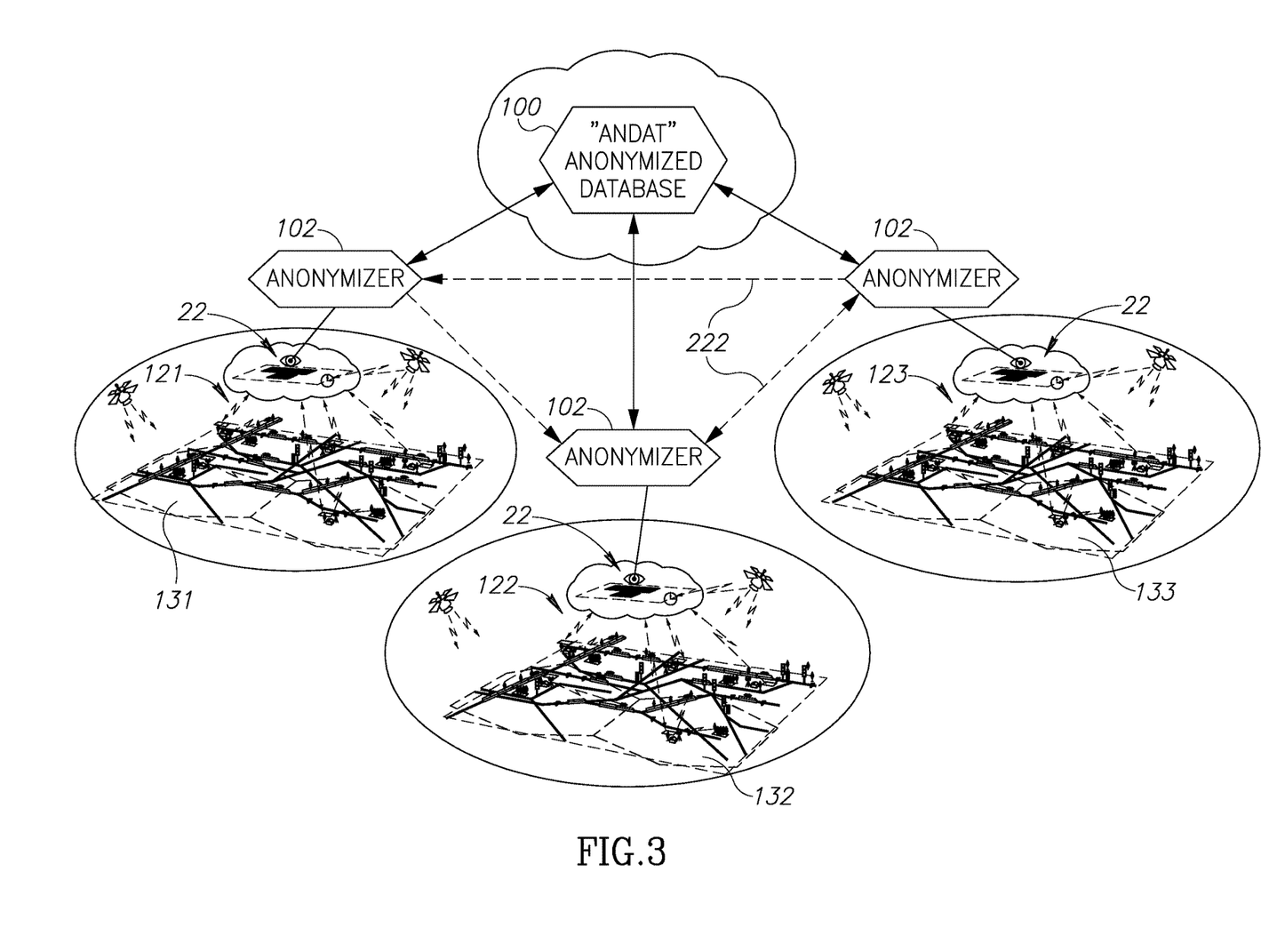
FIG. 3 schematically shows a plurality of three Rail-Eye systems that cooperate to use a common, optionally cloud based, anonymized database, ANDAT, in accordance with an embodiment of the disclosure.

FIG. 3 schematically shows a plurality of optionally three Rail-Eye systems 121, 122, and 123, that operate to protect railways 131, 132, 133 respectively and cooperate to use a common, optionally cloud based, ANDAT 100 in which each of the cooperating Rail-Eye systems may store and/or receive anonymized cyber-attack data related to cyber-attack scenarios that the Rail-Eye has encountered. Each Rail-Eye is assumed, by way of example to comprise components similar to those of Rail-Eye 20 (FIG. 1A), and in addition to have an anonymizer 102 that is comprised in, or that communicates with hub 22 of the Rail-Eye. In FIG. 3 anonymizers 102 are shown, by way of example, as configured to communicate with but separate from their respective hubs 22. A plurality of cooperating Rail-Eye systems in accordance with an embodiment, such as Rail-Eye systems 121, 122, and 123, may be referred to as a Rail-Eye conglomerate.

An anonymizer 102 operates to "scrub" information items from data that a Rail-Eye system 121, 122, or 123 uploads for storage to ANDAT 100 or downloads from ANDAT so that the data cannot readily be associated with a given one of Rail-Eye systems 121, 122, or 123 or the railways that they protect. For convenience of presentation, it is assumed that an anonymizer scrubs cyber-attack data from its associated Rail-Eye prior to the Rail-Eye uploading the data. Scrubbing may involve deleting, encrypting, or otherwise disguising, generically referred to as encrypting, information items from data related to a cyber-attack to increase difficulty of associating the cyber-attack data with a particular Rail-Eye or a railway that the Rail-Eye protects, which encountered the cyber-attack. Whereas scrubbing information in accordance with embodiment operates to encrypt information items it is generally constrained to maintain integrity of information relevant to determining whether an anomalous event indicates a cyber-attack and/or relevant to identifying cyber-attacks that may be indicated by similar anomalous events.

For example, ERTMS/ETCS communications are based on variables, packets, and messages that are nested, defined, and configured in accordance with specific syntaxes. ERTMS/ETCS variables are used to encode single data values. ERTMS/ETCS packets may include more than one variable and comprise a header that identifies the packet by a unique packet type number, referred to as a NID-Packet. The header may include such administrative variables that may identify a railway, such as a country code, NID_C", a RBC code, "NID_RBC", a train driver code "Driver_ID", a user identity "NID_USER", "Q_DIR" which specifies a running direction of a Eurobalise group, and a "Q_SCALE", which specifies a distance scale that characterizes distance information that may be included in a packet payload. ERTMS/ETCS messages typically group a plurality of ERTMS/ETCS variables and/or packets. As in the case of an ERTMS/ETCS packet, an ERTMS/ETCS message comprises a header that includes an ID number referred to as a NID_MESSAGE, that identifies the type of message, and administrative variables. Administrative variables may include a time, "T_TRAIN", in accordance with a trainborne clock, a balise group identity number "NID_LRBG", and/or a track gradient profile. A telegram is a type of message that is transmitted by a single spot device, such as a balise.

In accordance with an embodiment, anonymizer 102 of Rail-Eye 121, 122, or 123 may scrub an ERTMS/ETCS message that the anonymizer or the Rail-Eye uploads to ANDAT 100 to provide an anonymized record of a cyber-attack and encrypt identifying variables from among variables, such as noted above, in the record that may be used to identify the Rail-Eye or the railway 131, 132, or 133 that the Rail-Eye protects.

In addition to scrubbing the data, anonymizing data optionally includes hiding the identity of a Rail-Eye 121, 122, 123 updating anonymized data to ANDAT 100. In an embodiment anonymizer 102 associated with Rail-Eye systems 121, 122, and 123 cooperate to hide the identity of a Rail-Eye updating anonymized data to ANDAT100. For example, in an embodiment, anonymizers 102 may communicate with each other via a ring communication network schematically represented by dashed arrows 222 connecting anonymizers 102 and referred to by the numeral 222. When a given Rail-Eye, 121, 122, or 123 generates anonymized data ready to upload to ANDAT 100, the given Rail-Eye sets a delay period having a random duration and transmits the anonymized data to the other anonymizers on the ring network. When another of the anonymizers receives the anonymized data, it downloads the anonymized data, sets a random delay and retransmits the anonymized data on the ring. Optionally, once the given anonymizer receives the anonymized data that it itself has generated and transmitted, it removes the anonymized data from circulation on the ring. Each anonymizer 102 uploads the anonymized data to ANDAT 100 at a time following a time at which the anonymizer generated or received the anonymized data from the ring delayed by the random delay that the anonymizer has set. In an embodiment, each of anonymizers 102 sets its random delay responsive to an algorithm that operates to provide each of the anonymizers with a different random delay and for which an order at which the different anonymizers 102 upload the anonymized data is also random. Since all the anonymizers upload the same anonymized data at different randomized times, it is advantageously difficult to determine which of Rail-Eye systems 131, 132, 133 is the source of the randomized data.

It is noted that whereas in the above description anonymizers 102 are described as communicating via a ring topology and uploading anonymized data to ANDAT 100, in an embodiment, components of Rail-Eye systems other than the anonymizers may be configured to communicate over a ring topology and operate to upload anonymized data to ANDAT 100.

Figure 4:
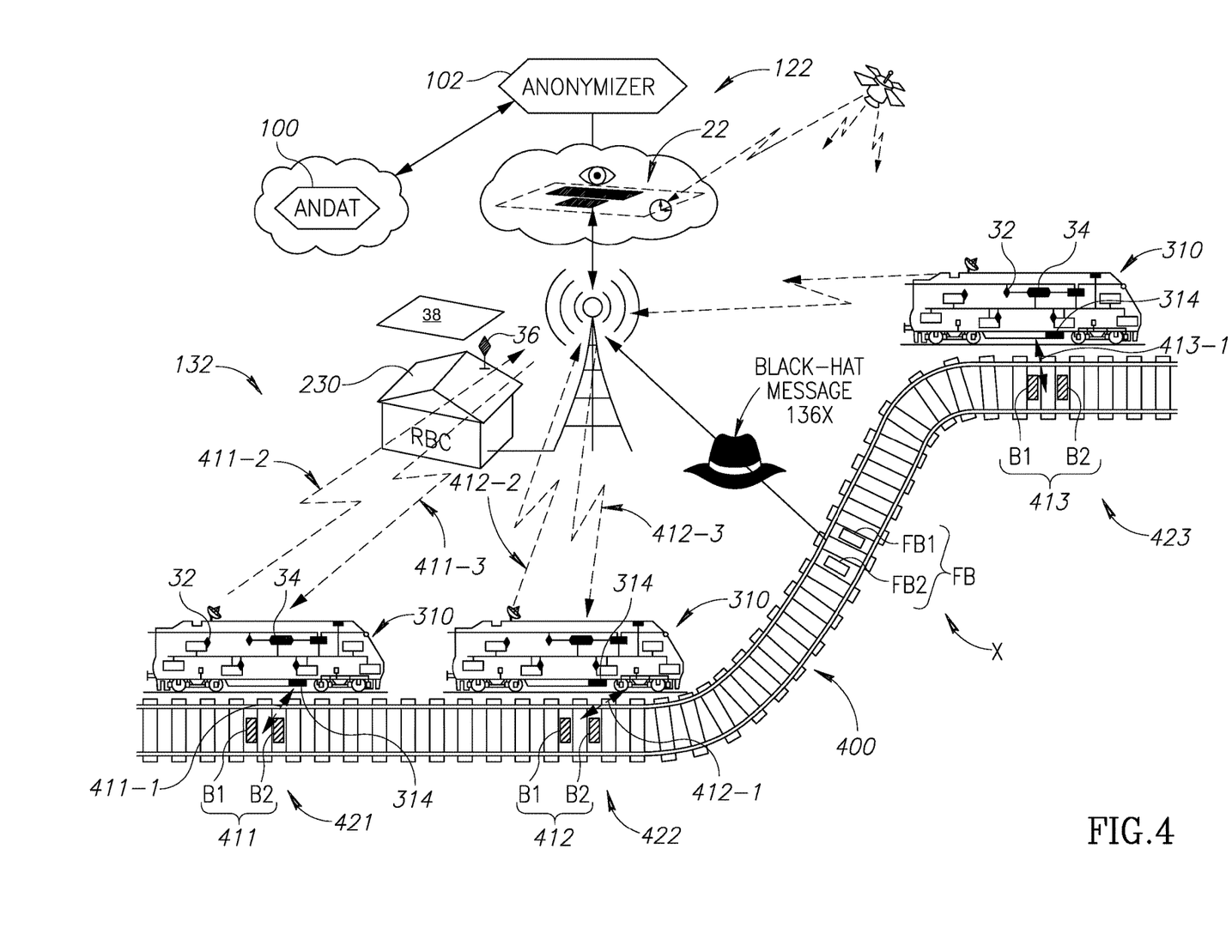
FIG. 4 schematically illustrates an example scenario in which, a Rail-Eye identifies an anomalous event indicative of a cyber-attack on a portion of a railway, generates, and uploads to ANDAT anonymized data relevant to the anomalous event, in accordance with an embodiment of the disclosure.

FIG. 4 schematically illustrates an example scenario in which, by way of example, Rail-Eye 122 that protects railway 132 (FIG. 3), identifies an anomalous event indicative of a cyber-attack on a portion of the railway, generates, and uploads to ANDAT 100 an anonymized report of the event.

In the example scenario of FIG. 4 a locomotive 310 (FIG. 2B) of a train 300 is schematically shown (without cars for convenience of presentation) passing over a curved section 400 of track in railway 132. Track section 400 comprises balise groups 411, 412, and 413, at region 421, 422, and 423 respectively of track section 400. By way of example, each balise group is assumed to comprise two balises, B1 and B2. Locomotive 310 is shown at locations 421, 422 and 423 along track 400 as it moves along the track in a direction indicated by a block arrow 401. A cyber criminal has installed a fake balise group, "FB", comprising fake balises FB-1 and FB-2 at a location "X" between locations 412 and 413. Fake balise group FB is configured to masquerade and assume the identity of balise group 413.

As locomotive 310 moves along track 400 through region 421 the locomotive balise reader 314 first encounters, passes over and energizes balises B1 and B2 in balise group 411. In response to being energized each balise in the balise group responds by transmitting a telegram schematically represented by a double-arrowhead line 411-1 to balise reader 314. Each telegram comprises information items such as N_PIG, which identifies the balise, B1 or B2 in balise group 411 transmitting the telegram, N_TOTAL, the total number of balises in balise group 411, and NID_C, which identifies the country in which balise group 411 is located. In response to receiving the balise telegrams 411-1 from B1 and B2 in balise group 411, locomotive 310 transmits an ERTMS/ETCS Train Position Report message 136 schematically represented by a lightning bolt arrow 411-2, to RBC 230 to report the position of locomotive 310. Message 136 may comprise packets that respectively provide an NID_Message, L Message, T_Train, noted above, and NID_Engine, which identifies engine equipment supplier, and NID-LRBG which identifies the balise group 411. RBC 230 responds with a movement authority Message 3, schematically indicated by a lightning bolt arrow 411-3, that the RBC transmits to locomotive 310. Message 3 comprises the message identifier NID_Message, T_Train, M_ACK, NID_LBRG. the identity of the last balise group (balise group 411) reported by locomotive 310 to RBC 230, and a packet 15 that provides a level 2/3 Movement Authority that informs locomotive 310 that it is authorized to proceed along the track 400. The sequence of track to train locomotive 310, train locomotive 310 to RBC 230, and RBC 230 to train locomotive 310 communications providing the train with a movement authority at location 421 is repeated at location 422 with a set of messages 412-1, 412-2 and 412-3 similar to messages 411-1, 411-2, and 411-3.

Upon passing over fake balise group FB at location X, the balise group FB telegrams the identification of balise group 413 causing locomotive 310 to send a false position report Message 136, schematically represented as a "black-hat" message 136X, that it had received a telegram from balise group 413. As a result, RBC 230 concludes incorrectly that locomotive 319 is located in region 423 where balise group 413 is located when the locomotive is actually located in region X. Since region X is closer than region 423 to region 422 from where locomotive 310 reported its last position, RBC 230 may incorrectly conclude that locomotive 310 is traveling much faster than it should be traveling. As result, RBC 23 may for example undertake actions to maintain safety of Railway 132, such as deny locomotive 310 movement authority and/or operate to effect an emergency stop of locomotive 310. Alternatively, by way of example, RBC 23 may transmit an incorrect movement authority. The actions of RBC 230 in response to receiving the incorrect location of locomotive 310 may engender serious and/or dangerous disruption of service provided by the railway.

In an embodiment an infrastructure cyber-snitch 36 monitoring communications in which RBC 230 participates may forward communications between locomotive 310 and RBC 230, such as messages 411-2, 411-3, 412-2, 412-3 and 136X to RBC aggregator 38 for analysis and/or forwarding to hub 22. Aggregator 38 may also receive messages from onboard cyber-snitches 32 comprised in locomotive 310 via an onboard aggregator 34 in the locomotive and, optionally forward the messages to hub 22. In an embodiment, an onboard snitch operating as a network tap may mirror communications incoming to the locomotive JRU to forward messages such as messages 411-1, 411-2, 411-3, 412-1, 412-2, 412-3 and 136X to RBC aggregator 38 for analysis and/or forwarding to hub 22. RBC aggregator 38 and/or hub 22 may process the messages from the cyber-snitches and determine that black-hat message 136X is an anomalous message that may have been generated as a result of a cyber-attack.

For example, RBC aggregator 38 and/or hub 22 may determine that onboard cyber-snitches 32 that generate signals responsive to locomotive wheel rotation, temperature of an electric traction motor in locomotive 310, and/or signals from an acoustic cyber-snitch that monitors sounds generated by operation of the locomotive, conflict with a conclusion that locomotive 310 is traveling above a safe speed limit. If in response to black-hat message 136X RBC 230 does not operate to stop movement of locomotive 310 along track 400, a valid position Message 136 received by RBC 230 from locomotive 310 when the locomotive passes over and receives telegrams from balise group 413 in region 423 may confirm that black-hat message 136X is spurious and may be indicative of a cyber-attack. In FIG. 4 telegrams from balises B1 and B2 in balise group 413 are represented by double-arrowhead line 413-1, and Message 136 from locomotive 310 at region 423 is represented by lighting arrow 413-2.

In an embodiment, anonymizer 102 comprised in Rail-Eye 122 scrubs black-hat message 136X and messages received by infrastructure aggregator 38 or hub 22 that are associated with black-hat message 136X, by encrypting information items in the messages that identify the black-hat and associated messages with railway 132. Optionally, following scrubbing, Rail-Eye 122 uploads via ring network 222 (FIG. 3) the scrubbed messages to ANDAT 100 to provide an anonymized event record for black-hat message 136X that may be accessed by Rail-Eye 121 and 123.

By way of example, scrubbing messages associated with black-hat message 136X may comprise normalizing train times T_Train in the messages to a time scale in which a first train time T_Train is 0, and/or deleting values for at least one or any combination of the variables NID-C, NID-LRBG, and NID-Engine from the messages.

There is therefore provided in accordance with an embodiment of the disclosure, a cyber security system for providing security to a railway, the system comprising: a data monitoring and processing hub; a network comprising a plurality of data collection agents synchronized to a same network clock and configured to monitor railway infrastructure devices and onboard devices of rolling stock having a train communication network (TCN), and forward monitored data to the hub for processing by the hub to detect anomalies in railway operation that are indicative of a cyber-attack; wherein an agent of the plurality of data collection agents monitoring an onboard device connected to the TCN of a given rolling stock receives signals propagated to or from the device via the TCN and forwards to the hub data based on a given received signal together with a time stamp comprising a network clock time at which the given received signal is received by the agent.

Optionally, the TCN comprises a multifunctional vehicle bus (MVB) coupled to a wired train bus (WTB) and the time stamp comprises a value of a time lapse between a beginning of a turn of the MVB during which the given received signal is propagated over the TCN. Optionally, the network of data collection agents is synchronized based on a reference frequency and time of day (TOD) timing information provided by Global Navigation Satellite System (GNSS) transmissions. Optionally, the timing information comprises a reference frequency and time of day (TOD). Optionally, the agent monitoring the onboard device comprises a primary reference time clock (PRTC) that provides the reference frequency and ToD.

In an embodiment of the disclosure an agent of the plurality of data collection agents is a stealth agent configured to operate in a stealth mode, in which stealth mode the agent is minimally disruptive of real time operation of a device that the agent monitors. Optionally, in the stealth mode, operation of the stealth agent satisfies limits to disruption established by an international standard. Optionally, the stealth mode agent is configured to monitor a device only during idle time of the device. Additionally or alternatively, the stealth agent may comprise an antenna configured to provide a wireless connection to a monitored device via which wireless connection the stealth agent receives signals from the monitored device with a minimum disruption to real time operation of the device. Optionally, the stealth agent is configured to receive a spreading code sequence to demodulate a signal that the stealth agent receives from the device. Optionally, the antenna is configured to provide a wireless connection to a radiating coax cable of a Euroloop.

In an embodiment of the disclosure the agents are configured to encode monitored data in a common protocol for forwarding to the hub.

In an embodiment of the disclosure the hub generates a signal occurrence frequency spectrum that provides a number of signals of a particular type that is received by the hub as a function of time. The hub may process the occurrence frequency spectrum to identify anomalies that may be indicative of a cyber-attack. Additionally or alternatively, the occurrence frequency spectrum provides a number of signals received during a given time period as a function of type of signals.

In an embodiment of the disclosure the hub generates a signal occurrence frequency spectrum for each of at least two different rolling stocks and processes the spectra to identify anomalies that might be indicative of a cyber-attack. In an embodiment of the disclosure the hub processes data that it receives from the agents to identify temporal anomalies in operation of infrastructure and/or onboard devices that might be indicative of a cyber-attack. In an embodiment of the disclosure the hub processes data that it receives to generate a context for operation of an infrastructure or rolling stock device and determines if operation of the device conflicts with the context to identify anomalies that might be indicative of a cyber-attack.

In an embodiment of the disclosure the cyber security may comprise at least one anonymizer configured to scrub information items from data that the hub receives from a data collection agent of the plurality of data collection agents which may be used to identify the cyber security system or the railway for which the system provides security.

There is further provided in accordance with an embodiment of the disclosure, a cyber security conglomerate comprising: a plurality of cyber security systems according to an embodiment of the disclosure, each providing security to a different railway system of a plurality of railway systems; for each cyber security system at least one anonymizer operable to scrub information items from data that the hub of the cyber security system receives from a data collection agent of the plurality of data collection agents which can be used to identify the cyber security system and/or the railway for which the cyber security system provides security; and a ring topology communications system over which the cyber security systems of the plurality of cyber security systems are configured to communicate to share scrubbed data.

Optionally, the cyber security conglomerate comprises a database configured to receive and store data that each of the at least one anonymizer scrubs. Optionally, the cyber security systems are configured to share data scrubbed by an at least one anonymizer of a given cyber security system of the plurality of cyber security systems with each of the other cyber security systems via transmission over the ring topology communications system. Optionally, each cyber security systems is configured to transmit scrubbed data that it generates, or receives via the ring topology network to the database. Each of the cyber security systems may be configured to transmit scrubbed data that it generates or receives via the ring topology network to the database. Each cyber security system may be configured to transmit to the database same shared data at a different random time relative to a time at which the cyber security system has generated or received the shared data.

In an embodiment each cyber security system of the plurality of cyber security systems is configured to access the database to receive scrubbed data from the database.

In an embodiment the scrubbed data comprises data that is indicative of a cyber-attack associated with a railway protected by a cyber security system of the plurality of cyber security systems.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A cyber security system for providing security to a railway, the system comprising:
   a data monitoring and processing hub;
   a network comprising a plurality of data collection agents synchronized to a same network clock and configured to monitor railway infrastructure devices and onboard devices of rolling stock having a train communication network (TCN), and forward monitored data to the hub for processing by the hub to detect anomalies in railway operation that are indicative of a cyber-attack;
   at least one anonymizer configured to scrub information items from data that the hub receives from a data collection agent of the plurality of data collection agents which information items are useable to identify the cyber security system or the railway for which the system provides security.

2. The cyber security system according to claim 1 wherein the data collection agents of the plurality of data collection agents are synchronized based on a reference frequency and time of day (TOD) timing information provided by Global Navigation Satellite System (GNSS) transmissions.

3. The cyber security system according to claim 2 wherein the timing information comprises a reference frequency and time of day (TOD).

4. The cyber security system according to claim 3 wherein an agent of the plurality of data collection agents that monitors an onboard device connected to the TCN of a given rolling stock comprises a primary reference time clock (PRTC) that provides the reference frequency and ToD.

5. The cyber security system according to claim 1 wherein an agent of the plurality of data collection agents is a stealth agent configured to operate in a stealth mode, in which stealth mode the agent is minimally disruptive of real time operation of a device that the agent monitors.

6. The cyber security system according to claim 5 wherein in the stealth mode, operation of the stealth agent satisfies limits to disruption established by an international standard.

7. The cyber security system according to claim 6 wherein the stealth mode agent is configured to monitor a device only during idle time of the device.

8. The cyber security system according to claim 6 wherein the stealth agent comprises an antenna configured to provide a wireless connection to a monitored device via which wireless connection the stealth agent receives signals from the monitored device with a minimum disruption to real time operation of the device.

9. The cyber security system according to claim 1 wherein the agents are configured to encode monitored data in a common protocol for forwarding to the hub.

10. The cyber security system according to claim 1 wherein the hub generates a signal occurrence frequency spectrum that provides a number of signals of a particular type that is received by the hub as a function of time.

11. The cyber security system according to claim 1 wherein the hub processes data that the hub receives from the agents to identify temporal anomalies in operation of infrastructure and/or onboard devices that are indicative of a cyber-attack.

12. The cyber security system according to claim 1 wherein the hub processes data that the hub receives to generate a context for operation of an infrastructure or rolling stock device and determines if operation of the device conflicts with the context to identify anomalies that might be indicative of a cyber-attack.

13. A cyber security conglomerate comprising:
   a plurality of cyber security systems according to claim 1, each cyber security system providing security to a different railway system of a plurality of railway systems; and
   a ring topology communications system over which the cyber security systems of the plurality of cyber security systems are configured to communicate to share scrubbed data.

14. The cyber security conglomerate according to claim 13 and comprising a database configured to receive and store data that each of the at least one anonymizer scrubs.

15. The cyber security conglomerate according to claim 14 wherein the cyber security systems are configured to share data scrubbed by at least one anonymizer of a given cyber security system of the plurality of cyber security systems with each of the other cyber security systems via transmission over the ring topology communications system.

16. The cyber security conglomerate according to claim 15 wherein each of the cyber security systems is configured to transmit scrubbed data that that the cyber security system generates or receives via the ring topology network to the database.

17. The cyber security conglomerate according to claim 16 wherein each of the cyber security systems is configured to transmit scrubbed data that the cyber security system generates or receives via the ring topology network to the database.

18. The cyber security conglomerate according to claim 17 wherein each cyber security system is configured to transmit to the database same shared data at a different random time relative to a time at which the cyber security system has generated or received the shared data.

19. The cyber security conglomerate according to claim 13 wherein each cyber security system of the plurality of cyber security systems is configured to access the database to receive scrubbed data from the database.

20. The cyber security conglomerate according to claim 13 wherein the scrubbed data comprises data that is indicative of a cyber-attack associated with a railway protected by a cyber security system of the plurality of cyber security systems.

\* \* \* \* \*